United States Patent [19]

Isomine et al.

[11] Patent Number: 4,747,630
[45] Date of Patent: May 31, 1988

[54] TOGGLE LINKAGE FOR A VEHICLE ROOF

[75] Inventors: Hideaki Isomine, Tochigi; Yasuo Fujita, Tokyo, both of Japan

[73] Assignee: Honda Giken Kogyo Kabushiki Kaisha, Tokyo, Japan

[21] Appl. No.: 834,908

[22] Filed: Feb. 28, 1986

[30] Foreign Application Priority Data

Feb. 28, 1985 [JP] Japan .................................. 60-39697

[51] Int. Cl.[4] .............................................. E05C 17/32
[52] U.S. Cl. .................................. 292/263; 292/DIG. 5
[58] Field of Search .......................... 292/263, DIG. 5; 296/224, 218; 217/60 E; 49/465

[56] References Cited

U.S. PATENT DOCUMENTS

| 4,005,901 | 2/1977 | Lutke et al. | 296/218 |
| 4,120,524 | 10/1978 | Buck | 292/263 |
| 4,127,302 | 11/1978 | Green | 296/224 X |
| 4,351,560 | 9/1982 | Kanou et al. | 296/218 X |
| 4,351,561 | 9/1982 | Tuchiya et al. | 296/224 X |
| 4,422,688 | 12/1983 | Kameoka | 292/DIG. 5 X |
| 4,422,689 | 12/1983 | Yamamoto et al. | 296/224 |

FOREIGN PATENT DOCUMENTS 497283 12/1938 United Kingdom .............. 217/60 E

Primary Examiner—Richard E. Moore
Attorney, Agent, or Firm—Irving M. Weiner; Joseph P. Carrier; Pamel S. Burt

[57] ABSTRACT

There is disclosed a toggle linkage for moving a closure panel between a ventilating position and a closed position. The closure panel is detachably arranged in an opening formed in a vehicle roof. The toggle linkage comprises a handle pivotably connected to the lower surface of the closure panel and having bearing lugs, a bearing component fixed on the lower surface of the vehicle roof and having a base, and a link mechanism for connecting the handle with the bearing component. In this arrangement, means are provided to limit rotation of the handle to a predetermined position whereby the closure panel is maintained in its ventilating position.

3 Claims, 4 Drawing Sheets

TOGGLE LINKAGE FOR A VEHICLE ROOF

BACKGROUND OF THE INVENTION

1. Field of the Invention

The present invention generally relates to an improvement in a toggle linkage for use in a closure panel detachably arranged in an opening formed in a vehicle roof.

2. Description of the Related Art

It is well known to provide a vehicle roof having an opening which is defined by a roof frame and is opened and closed by a metal or glass closure panel for ventilating purposes. The conventional closure panel is hingedly mounted to the roof frame and is moved between a ventilating position and a closed position by means of a manually operated toggle linkage.

An exemplary toggle linkage of this type is disclosed in Japanese patent publication No. 58/45937. Such toggle linkage generally comprises a first link pivotably connected by pivot pins to brackets on the lower surface of a closure panel, a handle integral with the first link, a bearing component fixedly mounted on the lower surface of a vehicle roof, and a pair of second links connecting the handle with the bearing component. Each of the second links includes a sleeve and a pivot pin. The second links are interconnected by a pin with its opposite ends inserted into the respective sleeves. Further, springs are disposed within the sleeves to normally urge the second links in a direction away from each other, thereby ensuring connection of the handle with the bearing component. With this arrangement, the closure panel is tilted upwardly to a ventilating position by rotating the handle in a clockwise direction, and can be detached from the vehicle roof by moving the second links in a direction closer to each other against the action of the springs to separate the pivot pins from the bearing component. It is important to note that in situation where external loads are applied to the vehicle with the closure panel in its angularly raised ventilating position, the handle is further rotated and the closure panel is moved rearwards. As a result, the forward portion of the closure panel is undesirably separated from the roof frame. In order to prevent this situation, it is necessary to improve the stiffness of a hinge mechanism or a vehicle roof assembly. This results in an undesirable increase in the weight and costs of the vehicle.

SUMMARY OF THE INVENTION

It is, therefore, an object of the present invention to provide an improved toggle linkage which may prevent a closure panel from falling off of a vehicle roof due to external loads when the closure panel is in its angularly raised ventilating position.

It is another object of the invention to provide a toggle linkage which is simple in construction, and is economical.

It is a further object of the invention to provide a toggle linkage which enables a closure panel to be safely and easily moved between an angularly raised position and a closed position.

According to the present invention there is provided a toggle linkage for moving a closure panel between a ventilating position and a closed position, said closure panel being detachably arranged in an opening formed in a vehicle roof, the toggle linkage comprises a handle pivotably connected to the lower surface of the closure panel and having bearing lugs, a bearing component fixed on the lower surface of the vehicle roof and having a base, and a link mechanism for connecting the handle with the bearing component. Means are provided to limit rotation of the handle to a predetermined position whereby the closure panel is maintained in its ventilating position.

BRIEF DESCRIPTION OF THE DRAWINGS

The above and further objects, features and advantages of the present invention will become more apparent from a consideration of the following detailed description when taken in conjunction with the accompanying drawings, in which.

DETAILED DESCRIPTION OF THE PREFERRED EMBODIMENT

Figure 1:
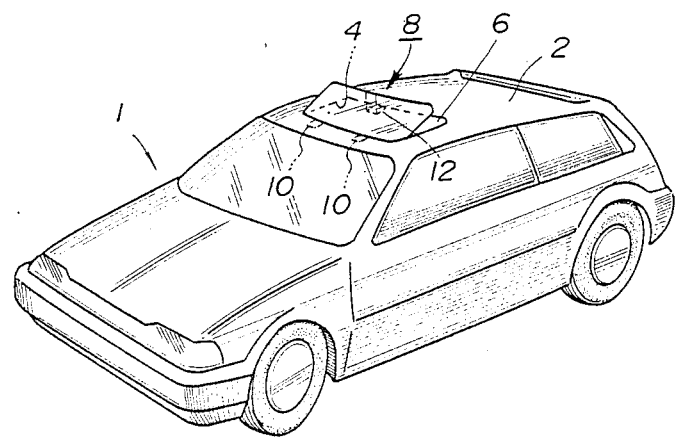
FIG. 1 is a schematic view, in perspective, of an automotive vehicle with a detachable closure panel in its ventilating position.

In FIG. 1, a vehicle generally indicated at 1 includes a vehicle roof 2. A roof frame 4 is attached to the vehicle roof 2 to define a roof opening 6 therein. Provided in the roof frame 4 is a hinge housing including a passage not shown. A closure panel 8 is detachably arranged in the opening 6 in such a manner that its forward edge is attached through two hinge tongues 10, 10 and its rearward edge through a toggle linkage 12 to the roof frame 4. By manually operating the toggle linkage 12, the closure panel 8 is tilted upwardly to a ventilating position as illustrated.

Figure 2:
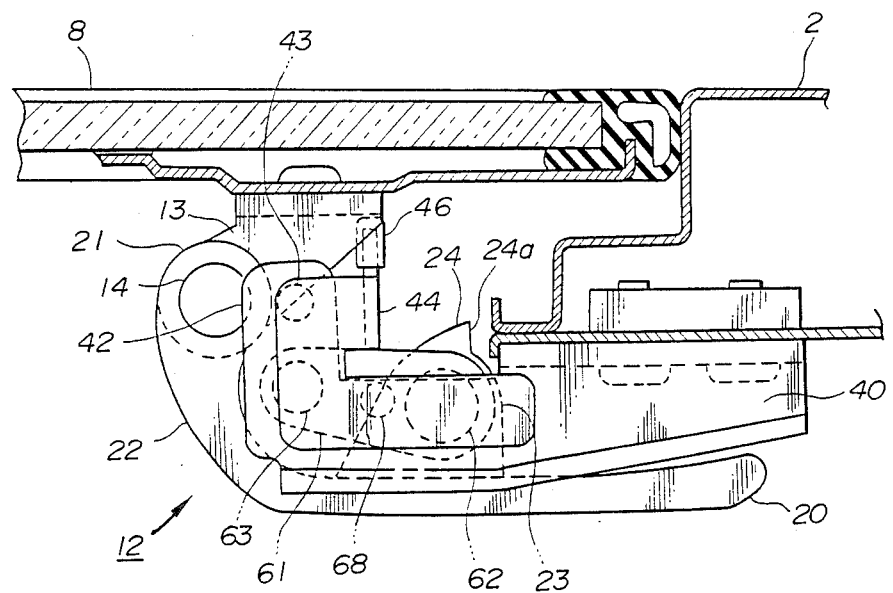
FIG. 2 is a side view of toggle linkage according to a preferred embodiment of the present invention.
Figure 3:
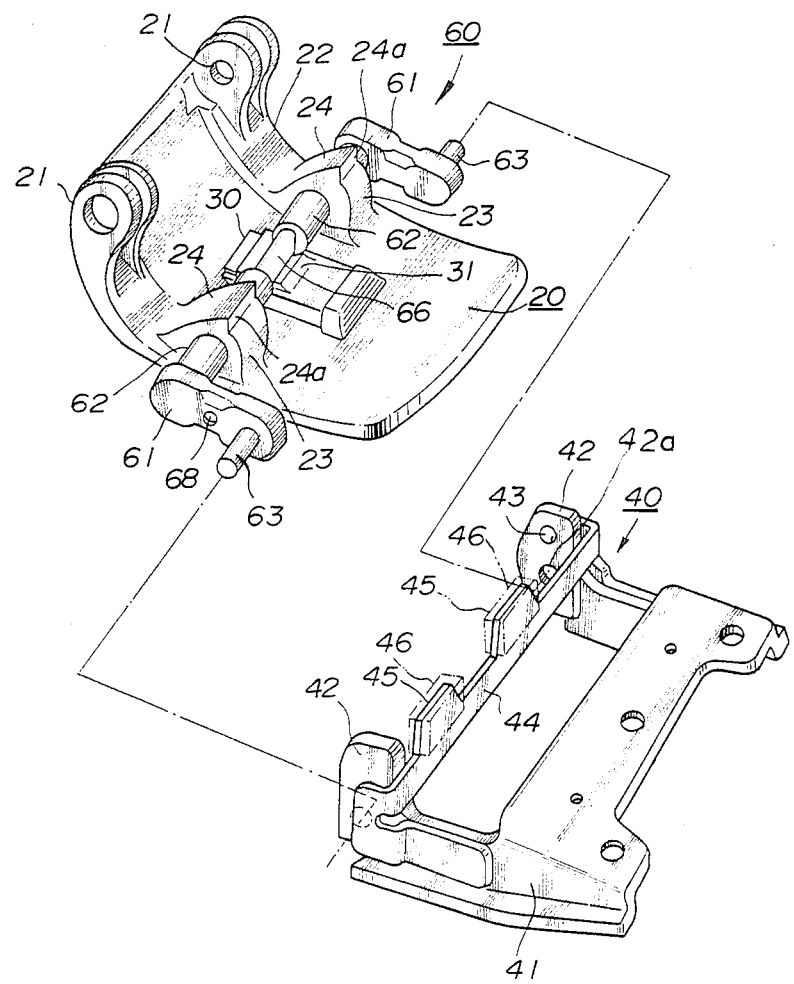
FIG. 3 is an exploded view, in perspective, of the toggle linkage of FIG. 2.

In FIG. 2 and FIG. 3, the toggle linkage 12 generally includes a handle 20 pivotably connected by a pivot pin 14 to a bracket 13 provided on the lower surface of the closure panel 8, a bearing component 40 fixedly mounted on the lower surface of the vehicle roof 2, and a link mechanism 60 connecting the handle 20 with the bearing component 40.

The handle 20 includes a link 22 having apertured ends 21, 21, and two bearing lugs 23, 23. Provided at the bearing lugs 23, 23 are first projections 24, 24 having engaging surface 24a, 24a adapted to engage with means provided at bearing component 40 as will later be explained in detail. A sliding member 30 is provided on the surface of the handle 20 between the two bearing lugs 23, 23 and is slidable thereon. The sliding member 30 has a convexed portion 31 thereon.

As best seen in FIG. 3, the bearing component 40 includes a base 41 which is fixed on the lower surface of the vehicle roof 2 by any suitable means, for instance, bolts, and has two arms 42, 42. The two arms 42, 42 have corresponding apertured ends 42a, 42a. Also, semispherical projections 43, 43 are provided at the forward ends of the arms 42, 42. A plate as generally indicated at 44 is secured to the base 41 by any suitable means, for instance, welding, and extends between the two arms 42, 42. This plate 44 includes two second projections 45, 45 covered by resilient members 46, 46.

Figure 6:
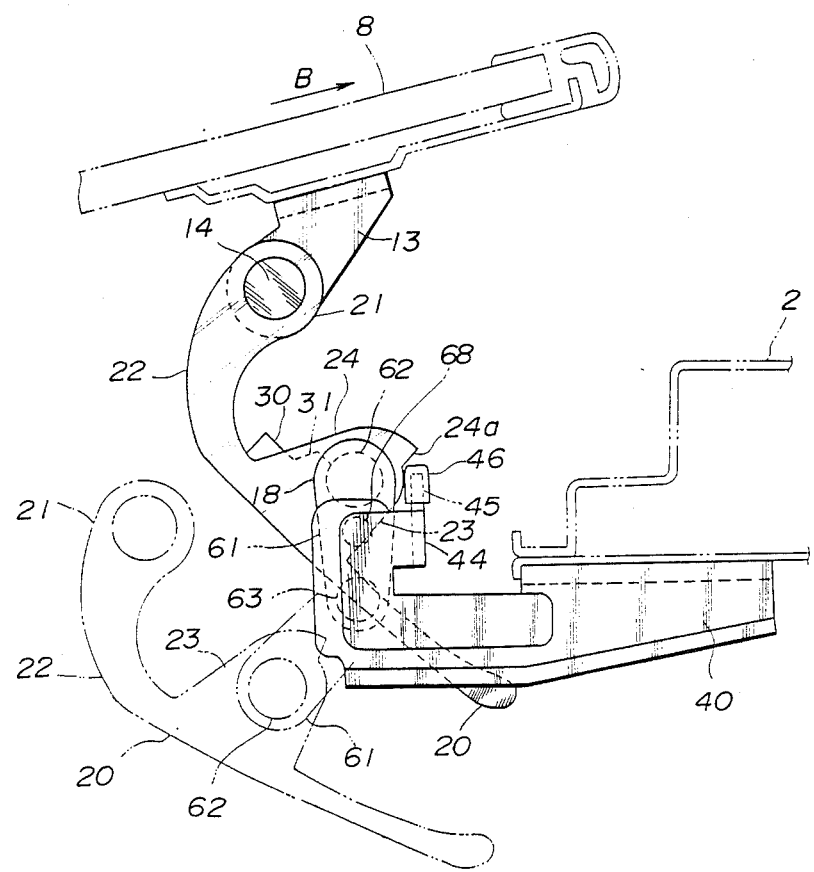
FIG. 6 is a side view of the toggle linkage in use.

The distance between the second projections 45, 45 is substantially equal to the distance between the first projections 24, 24. In this arrangement, when the closure panel 8 is tilted upwardly to an angularly raised ventilating position by rotation of the handle 20 in a clockwise direction as shown in FIG. 6, the engaging surfaces 24a, 24a are brought into engagement with the corresponding top surfaces of the resilient members 46, 46 to limit further rotation of the handle 20. Thus, movement of the closure panel 8 in the direction of the arrow B is stopped and the closure panel 8 is safely and firmly maintained in its ventilating position. It will be appreciated that the plate 44 may be integrated in the base 41.

Figure 4:
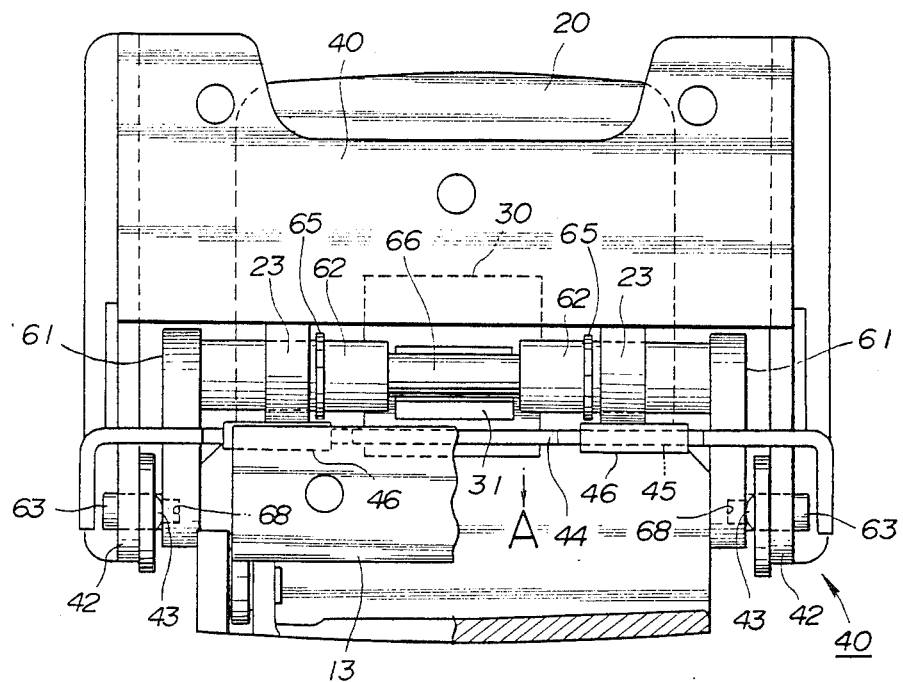
FIG. 4 is a plan view, partially in section, of the toggle linkage.
Figure 5:
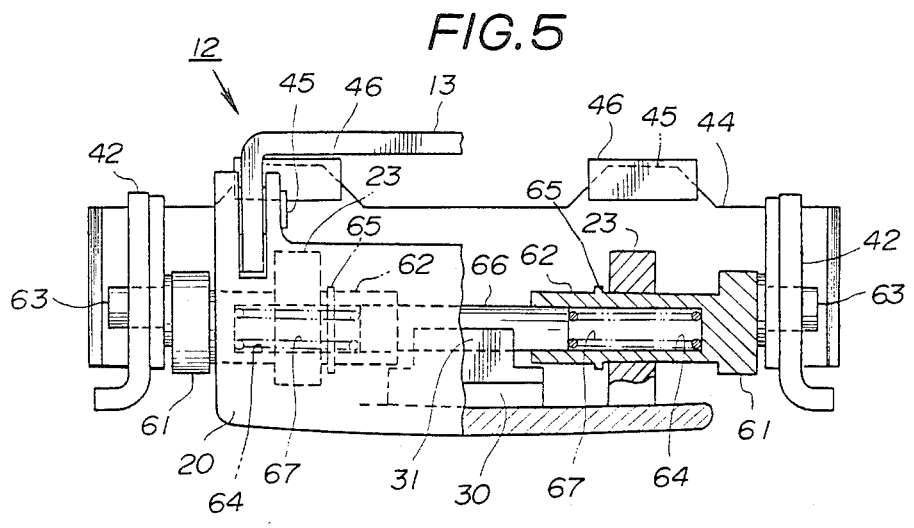
FIG. 5 is a front view, partially in section, of the toggle linkage.

In FIGS. 3 to 5, a link mechanism 60 includes a pair of tilting levers 61, 61. First shafts 62, 62 are integrally formed on respective inner sides of the tilting levers 61, 61. The first shafts 62, 62 are journalled by the bearings lugs 23, 23 of the handle and are axially slidable. Second shafts 63, 63 are integrally formed on the respective outer sides of the tilting levers 61, 61, each having a diameter smaller than the diameter of each of the first shafts 62, 62. The link mechanism 60 is pivotably connected through the second shafts 63, 63 to the bearing component 40. Holes 64, 64 are formed in the first shafts 62, 62 and the pair of tilting levers 61, 61 are interconnected by a pin 66, opposite ends of which being inserted into the respective holes 64, 64 as best seen in FIG. 5. Furthermore, springs 67, 67 are disposed in the holes 64, 64 to normally urge the tilting levers 61, 61 in a direction away from each other. Rings 65, 65 are fitted to the first shafts 62, 62 to prevent release of the first shafts 62, 62 from the bearing lugs 23, 23 of the handle 20. On the other hand, movement of the tilting levers 61, 61 in a direction closer to each other against the action of the springs is limited by the convexed portion 31 of the sliding member 30. The tilting levers 61, 61 also have recesses 68, 68. With this arrangement, when the handle 20 is rotated in a clockwise direction to its completely raised ventilating position, the semispherical projections 43, 43 are brought into engagement with the recesses 68, 68 so as to maintain the tilting levers 61, 61 in their upright positions. Under these conditions, if external loads are applied to the vehicle 1, further rotation of the handle 20 is limited upon engagement of the engaging surfaces 24a, 24a with the resilient members 46, 46 as mentioned above.

Removal of the closure panel 8 from the vehicle roof 2 is effected first by sliding the sliding member 30 on the handle 20 in the direction of the arrow A see FIG. 4 to disengage the convexed portion 31 from the first shafts 62, 62 and then, moving the tilting levers 61, 61 in a direction closer to each other against the action of the springs 67, 67 to release the second shafts 63, 63 from the apertured ends 42a, 42a in the arms 42, 42 of the bearing component 40.

While there has been described what is at present considered to be the preferred embodiment of the invention, it will be understood that the invention is not limited thereto, and that various changes and modifications may be made without departing from the scope thereof.

What is claimed is:

1. A toggle linkage for moving a closure panel between a ventilating position and a closed position, said closure panel being detachably arranged in an opening formed in a vehicle roof, comprising:
    a handle pivotably connected to the lower surface of said closure panel and having bearing lugs;
    a bearing component fixed on the lower surface of said vehicle roof and having a base;
    a link mechanism for connecting said handle with said bearing component; and
    means for limiting rotation of said handle to a predetermined position whereby said closure panel is maintained in said ventilating position;
    said means comprises a first engaging means provided at said bearing lugs, and a second engaging means provided at said bearing component, said first engaging means being brought into engagement with said second engaging means when said closure panel is tilted upwardly to said ventilating position;
    said first engaging means includes first projections and said second engaging means includes a plate secured to said base of said bearing component;
    said plate includes second projections for engagement with said first projections; and
    said second engaging means further includes resilient members adapted to cover said second projections.

2. A toggle linkage according to claim 1, wherein said link mechanism includes a pair of tilting levers, first shafts, each integrally formed on one side of each of said tilting levers and journalled by each bearing lug, and second shafts, each integrally formed on the other side of each of said tilting levers and connected to said bearing component, said first shafts having holes therein in which springs are disposed and a pin being inserted into said holes to interconnect said tilting levers.

3. A toggle linkage according to claim 2, wherein said handle includes thereon a sliding member having a convexed portion, said convexed portion being positioned between said first shafts of said link mechanism to limit movement of said tilting levers in a direction closer to each other.

* * * * *

UNITED STATES PATENT AND TRADEMARK OFFICE
CERTIFICATE OF CORRECTION

PATENT NO. : 4,747,630

DATED : May 31, 1988

INVENTOR(S) : Isomine et al.

It is certified that error appears in the above-identified patent and that said Letters Patent is hereby corrected as shown below:

```
Column 1, line 39, change "situation" to --situations--.
Column 3, line 18, change "bearings" to --bearing--;
         line 50, change "see Fig. 4" to --(see Fig. 4)--.
```

Signed and Sealed this

First Day of November, 1988

Attest:

DONALD J. QUIGG

Attesting Officer

Commissioner of Patents and Trademarks